United States Patent [19]

Kashima et al.

[11] Patent Number: 4,955,730

[45] Date of Patent: Sep. 11, 1990

[54] OIL-PRESSURE BEARING APPARATUS

[75] Inventors: Mitsuhiro Kashima; Kensei Suzuki, both of Kani, Japan

[73] Assignee: Kayaba Kogyo Kabushiki Kaisha, Tokyo, Japan

[21] Appl. No.: 444,590

[22] Filed: Dec. 1, 1989

[30] Foreign Application Priority Data

Dec. 5, 1988 [JP] Japan ............... 63-158199
Dec. 5, 1988 [JP] Japan ............... 63-158200
Aug. 22, 1989 [JP] Japan ............... 1-215613

[51] Int. Cl.$^5$ ............................................. F16C 32/06
[52] U.S. Cl. .................... 38.4/101; 384/121; 384/901
[58] Field of Search ............ 384/101, 102, 121, 123, 384/111, 901

[56] References Cited

U.S. PATENT DOCUMENTS

| 3,938,862 | 2/1976 | Schürger et al. | 384/111 |
| 4,417,823 | 11/1983 | Drevet et al. | 384/111 |
| 4,439,050 | 3/1984 | Garner | 384/901 |
| 4,836,042 | 6/1989 | Slocum | 384/123 |

Primary Examiner—Lenard A. Footland
Attorney, Agent, or Firm—Jordan and Hamburg

[57] ABSTRACT

An oil-pressure-supplied bearing apparatus which is ideally suited for the support of rotating shafts receiving significantly heavy thrust loads such as the propulsion shaft of a vessel. A plurality of pressurized chambers receiving oil pressure and a plurality of pressurized clearances are formed facing each other on both sides of a plurality of floating discs fixed to the rotating shaft and between a pair of bearing housings supporting the rotating shaft. Oil delivered to the pressurized chambers is fed back to the oil tank via the pressurized clearances. When the pressurized clearance opposite the direction of the thrust load narrows, oil pressure in the pressurized chambers rises and resists the thrust load. Meanwhile, floating discs on the rotating shaft are lubricated by oil passing through those pressurized clearances. When the direction of the thrust load is reversed, the inverted thrust load is supported by the pressurized chamber and the pressurized clearance on the opposite side.

7 Claims, 4 Drawing Sheets

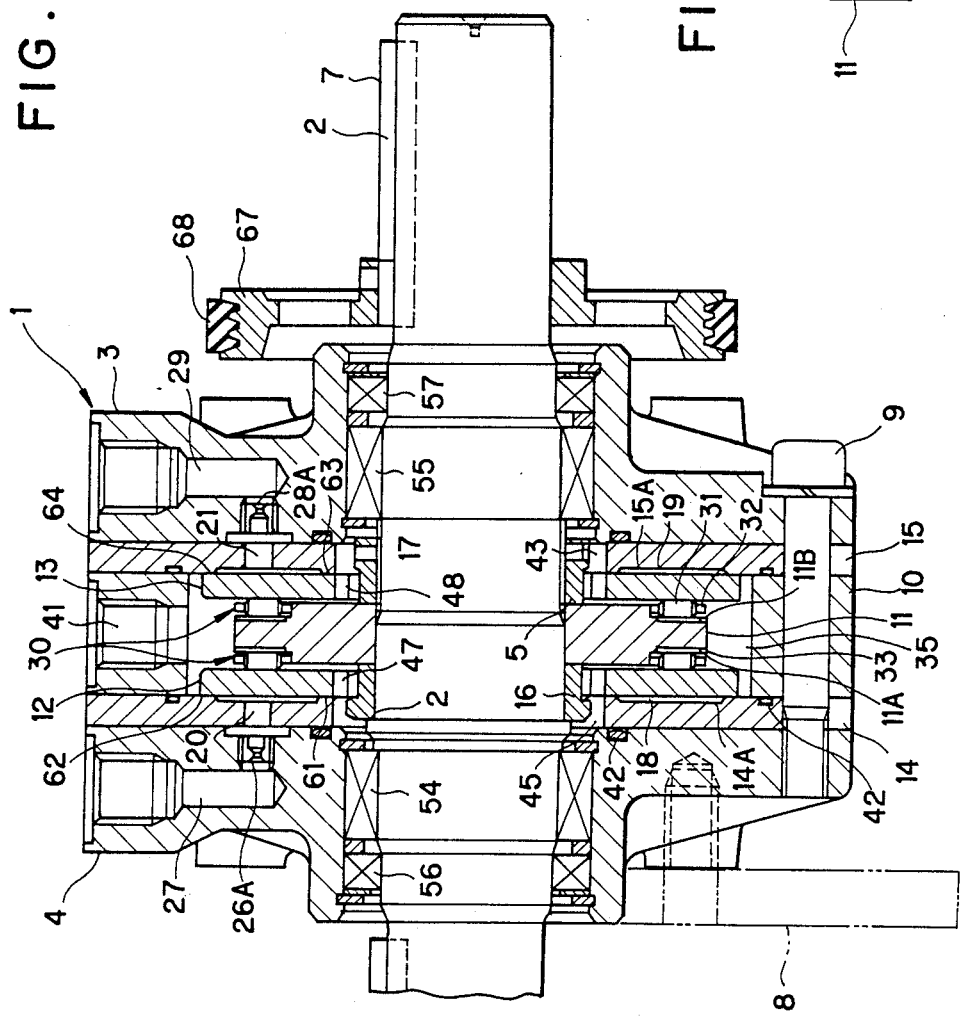

OIL-PRESSURE BEARING APPARATUS

BACKGROUND OF THE INVENTION

The present invention relates to an oil-pressure-supplied bearing apparatus which supports thrust loads acting on rotating shafts by means of oil pressure.

For example, it is essential for a vessel to have its propulsion shaft provided with a thrust bearing apparatus in order to support the thrust force generated by the screw propellers when the vessel moves ahead or astern. Since the vessel moves ahead or astern by overcoming the wake resistance, extremely heavy thrust loads act on the thrust bearing apparatus, and, since the direction of the rotation of the screw propellers is reversed when the vessel moves ahead and astern, the load is also inverted from thrust to taw and vice-versa.

If the bearing apparatus receiving reversible heavy loads were composed of a ball-and-roller bearing, the structure becomes complicated and bulky. Furthermore, since extremely heavy loads concentrate on the ball-androller bearing, noise increases significantly. In addition, there is a critical problem regarding the load-resistance capacity and durability. To solve the problems mentioned above, the U.S. Pat. No. 3,602,184 discloses a bearing system for use in vessels, which supports thrust loads by applying oil pressure without the use of the ball-and-roller bearing system. However, this prior art involves too complicated bearing structures for the support of thrust loads.

OBJECT OF THE INVENTION

The invention has been designed to fully solve the problems mentioned above by providing a novel oil-pressure bearing apparatus featuring minimal loss of torque, minimal noise, compact size, outstanding loadresistance capacity and durability, and simple structure, merely by applying oil pressure to fully support reversible thrust loads.

SUMMARY OF THE INVENTION

According to the invention, the freely rotating shaft receiving thrust loads is supported by the bearing housings. The rotary shaft is provided with a plurality of floating discs capable of relative rotations with respect to each other. A plurality of pressurized chambers and pressurized clearances are provided on both sides of these floating discs and between the bearing housings and surround the rotating shaft. A plurality of oil-supply passages linking each pressurized chamber to the oil-pressurizing source and an oil feedback passage linking the pressurized clearances to the oil tank are provided. A plurality of rolling components functioning as supplementary bearings in contact with the end surfaces of the front and rear floating discs are provided between these floating discs as required.

Oil under a predetermined pressure is fed to each pressurized chamber via the oil-supply passages. The pressurized oil flows to the tank via each pressurized clearance while acting on each floating disc. When the floating discs move in the axial direction under the action of the thrust load, the pressurized clearances on one side narrow, and simultaneously, the pressurized clearances on the other side widen. As a result, oil pressure generated in the pressurized chamber facing a rotating surface becomes higher than that generated in the other pressurized chamber facing the other rotating surface. Consequently, the oil-pressure reaction force acting on the floating discs intensifies until it is proportional to the thrust load. As a result, the thrust load acting in either direction of the rotating shaft is properly supported.

In the event that the oil pressure decreases as a result of a malfunction of the oil pump system feeding oil under pressure to the pressurized chamber, the floating disc on one side is pressed against the wall surface of the bearing housing by the thrust force. Nevertheless, the floating disc on the other side can rotate freely and is relatively supported by the supplementary bearings to relieve the floating disc pressed against the bearing housing, and thus, the rotating shaft can rotate smoothly in a stable manner.

The thrust-load transmission point from the rotating shaft to the floating disc is so arranged that the amount of deformation of the floating discs can be properly balanced throughout the inner and outer diameters. As a result, metallic contact between the floating disc and the bearing housing can be safely prevented. At the same time, the thrust load can be effectively supported merely by using a modest-capacity oil-pressurizing source.

Since the arrangement of the invention supports thrust loads acting on the rotating shaft merely by applying oil pressure, no objectionable noise can be generated, and yet, the durability of the apparatus is safely promoted. Furthermore, since the oil-pressure bearing apparatus embodied by the invention can adequately deal with extremely heavy thrust loads merely by increasing the oil pressure, even the compactly-built bearing has a substantial load-resistance capacity.

BRIEF DESCRIPTION OF THE DRAWINGS

FIG. 5 illustrates a vertical sectional view of the second arrangement of the oil-pressure apparatus related to the invention;

FIG. 6 illustrates a partial sectional view showing details of the installed floating disc according to the second arrangement shown in FIG. 5.

DETAILED DESCRIPTION OF PREFERRED ARRANGEMENTS

Referring now more particularly to the accompanying drawings, preferred arrangements of the oil-pressure bearing apparatus related to the invention are described below.

Figure 1:
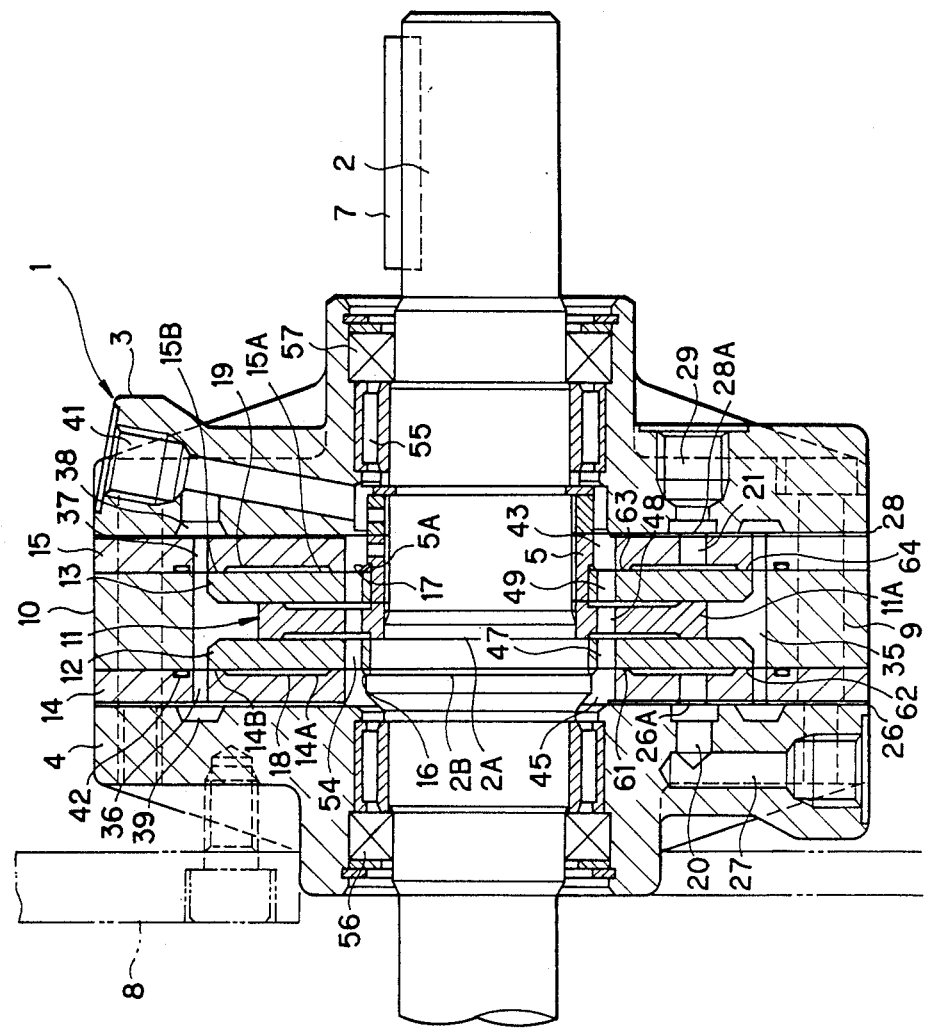
FIG. 1 illustrates a vertical sectional view of the first arrangement of the oil-pressure bearing apparatus related to the invention.

FIG. 1 illustrates the first arrangement of the oil-pressure bearing apparatus suited for use when dealing with extremely heavy thrust loads acting on the propulsion shaft of a large vessel.

As shown in FIG. 1, the oil-pressure bearing apparatus 1 provided for the propulsion transmission system of a large vessel is coupled to the drive shaft of the engine (not shown) via the end of the rotating shaft 3, where the other end of the rotating shaft 2 is coupled with the screw driving shaft (not shown) via the key 7. This mechanism allows the torque of the engine to be transmitted to the screw so that the propulsion force can eventually be generated.

The oil-pressure bearing apparatus 1 is provided with a pair of bearing housings 3 and 4. The bearing housing 4 is secured to the hull via bracket 8, whereas the other bearing housing 3 is secured to the bearing housing 4 with a plurality of bolts 9. Stationary disc 11 is fixed at the mid portion of the rotating shaft 2. The stationary disc 11 is secured between the circular step member 2A which is integrally formed with the rotating shaft 2 and the nut 5 which is secured to the rotating shaft 2. Circular projection 11A projecting from side to side in the axial direction is integrally formed the outer circumferencial edge of the stationary disc 11. Floating discs 12 and 13 on both sides of the stationary disc 11 are attached to the rotating shaft 2 by sliding along it.

Flush spring 17 is installed between the floating disc 12 and the circular step member 2B which is integrally formed with the rotating shaft 2. The floating disc 12 is pressed against the circular projection 11A of the stationary disc 11 by a force provided by the flush spring 17.

A pair of slide plates 14 and 15 composing part of the bearing housing are provided between the bearing housings 3 and 4 by sandwiching the floating discs 12 and 13.

Circular oil lands 14A, 14B, 15A, and 15B, facing each other, are symmetrically arranged on the side plates 14 and 15. As a result, the circular pressurized chambers 18 and 19 are respectively formed between these oil lands 14A, 14B, 15A, and 15B, and the floating discs 12 and 13.

The circular projection 11A of the stationary disc 11 is installed at a position opposite the center of the radial direction of the pressurized chambers 18 and 19. As described later on, the acting point of the load from the stationary disc 11 against the floating discs 12 and 13 is located in the region used for balancing the amount of deformation of the inner and outer circumferences of the floating discs 12 and 13 resulting from the distribution of the oil pressure inside the pressurized chambers 18 and 19.

Through holes that can be respectively opened to the pressurized chambers 18 and 19 are provided in the side plates 14 and 15. Orifice 26A connected to the through hole 20 is provided in the thin plate 26 which is installed between the bearing housing 4 and the side plate 14. Oil-supply passage 27 which connects the pressurized chamber 18 to an oil pump (not shown) via the orifice 26A is provided. Another orifice 28A connected to the through hole 21 is provided in the thin plate 28 which is installed between the bearing housing 3 and the side plate 15. Another oil-supply passage 29 which connects the pressurized chamber 19 to another oil pump (not shown) via the orifice 28A is provided. These orifices 26A and 28A are respectively provided for oil pressure adjustment purposes.

Circular pressurized clearance 61 through 64 are formed so that each can be connected to the inner and outer circumferential surfaces of the pressurized chambers 18 and 19.

Circular spacer 10 is provided between the side plate 14 and 15 and on the outer circumference of the floating discs 12 and 13. The spacer 10 controls the adjustment of the pressurized clearances 61 through 64. Oil-seal ring 42 is installed between the side plate 14/15 and the spacer 10.

Circular oil passage 35 is provided between the floating discs 12 and 13, and between the outer circumference of the stationary disc 11 and the spacer 10. A plurality of through holes 36 and 37 open to the circular oil passage 35 are provided in the side plates 14 and 15.

Circular oil passage 39 open to the through hole 36 is formed between the side plate 14 and the bearing housing 4. Circular oil passage 38 open to through hole 37 is formed between the side plate 15 and the bearing housing 3. Oil-feedback passage 41 linked to the oil tank (not shown) is connected to the circular oil passage 38.

Through holes 47 through 49 are provided in the floating discs 12 and 13 and the inner circumference of the stationary disc 11 at regular intervals. Circular oil passage 45 open to through hole 47 is formed between the side plate 14 and the rotating shaft 2. Another circular oil passage 43 open to through hole 49 is formed between the side plate 15 and the nut 13. The oil feedback passage is also connected to the circular oil passage 43.

A pair of needle bearings 54 and 55 are installed between the bearing housing 4 and the rotating shaft 2 across the stationary disc 11. Oil-sealing members 56 and 57 are respectively installed at the apertures of the bearing housings 3 and 4.

Next, the functional operation of the oil-pressure bearing apparatus related to the invention is described below.

FIG. 10 illustrates a block diagram of the oil-pressurizing circuit of the oil-pressure bearing apparatus embodied by the invention. Oil output from the oil pump 6 flows into the pressurized chambers 18 and 19 via the oil-supply passages 27 and 28 and the orifices 26A and 28A, and then flows through the pressurized clearances 61 through 64 while acting on the floating discs 12 and 13 before eventually being fed back to the oil tank 66 via the oil feedback passage 41.

Figure 2:
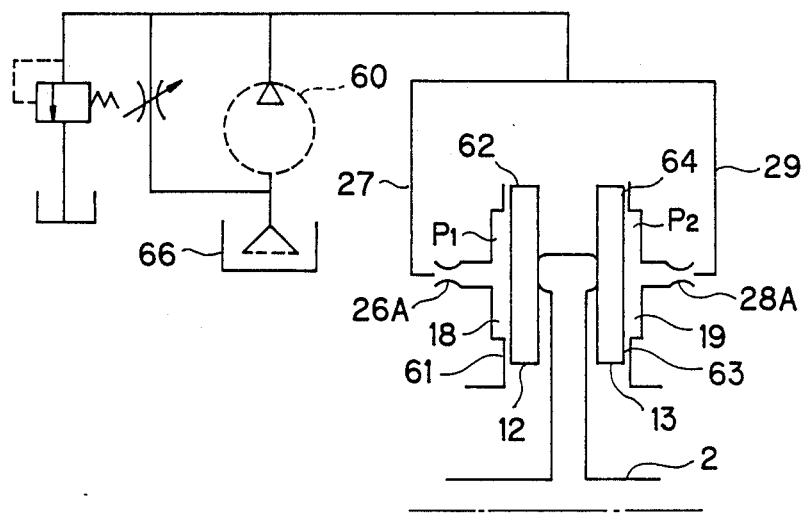
FIG. 2 illustrates a block diagram of the oil-pressurizing circuit used in the first arrangement.

As shown in FIG. 2, when the thrust load W acting on the rotating shaft 2 is zero, an almost equivalent volume of oil flows out of the pressurized clearances 61 through 64, and as a result, oil pressures $P_1$ and $P_2$ in the pressurized chambers 18 and 19 acting on both sides of the stationary disc 11 are equalized.

Figure 3:
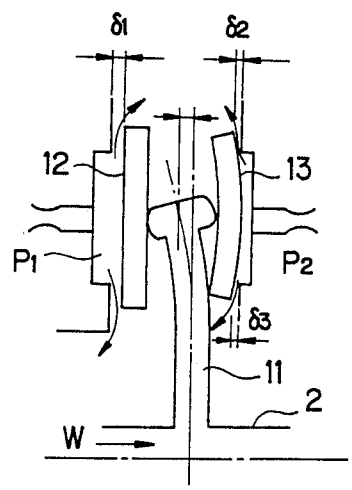
FIGS. 3 and 4 respectively illustrate the function of the first arrangement for the support of thrust loads by applying oil pressure.

As shown in FIG. 3, when the thrust load W acts on the rotating shaft 2 in the right direction, the stationary disc 11 moves to the right together with the floating discs 12 and 13. As a result, the clearance $\delta_2$ of the pressurized clearances 63 and 64 facing the floating disc 13 shown on the right becomes narrower than the clearance $\delta_1$ of the pressurized clearances 61 and 62 shown on the left by the displaced amount. Since the clearance relationship is $\delta_2 < \delta_1$, different volumes of oil flow out of the pressurized chambers 18 and 19. The oil pressure $P_2$ of the pressurized chamber 19 shown on the right becomes higher than the oil pressure $P_1$ of the pressurized chamber 18 shown on the left. The result of the multiplication of the oil pressure difference $P_2 - P_1$ by the effective area S balances the thrust load W and controls the displacement of the stationary disc 11 in the axial direction. In this way, since the oil-pressure reaction force working on the stationary disc 11 is intensified until it is proportional to the thrust load W, the system embodied by the invention can support extremely heavy reversed thrust loads as well.

When operating the oil-pressure bearing apparatus, a deflection X can be generated in the stationary disc 11 as a result of the deformation caused by the thrust load W. However, due to the presence of the floating disc 13 between the stationary disc 11 and the side plate 15, the deflection X does not directly affect the clearances $\delta_3$ and $\delta_2$ of the pressurized clearances 63 and 64.

Figure 4:
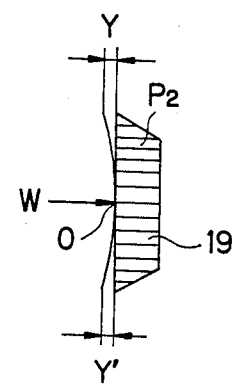

The floating disc 13 is deformed by the thrust load W acting on the floating disc 13 itself via the stationary disc 11. However, as shown in FIG. 4, by arranging for the contact (acting point) O of the stationary disc 11 to be against the floating disc 13 at the center of the pressure distribution of the pressurized chamber 18, it is possible for the system to equalize the deflections Y and Y' in the region forming the pressurized clearances 63 and 64 with respect to the floating disc 13 so that the clearances 63 and 64 can be maintained uniform. This in turn allows the system to prevent an increase in the volume of oil flowing out of the clearances 63 and 64 caused by the deformation of the floating disc 13 and maintain the oil pressure acting on the floating disc 13. This also allows the system to prevent the occurrence of metallic contact which leads easily to abrasion of these metallic components. Consequently, the arrangement of the invention can reduce the rigidity required for the floating discs 12 and 13 and the stationary disc 11, reduce the thickness of these metallic sheets, and allows manufacturers to build a compact oil-pressure bearing apparatus.

FIG. 5 illustrates the second arrangement of the oil-pressure bearing apparatus related to the invention. The second arrangement is particularly suited for use when extremely high reliability is expected from the oil-pressure bearing apparatus. More particularly, the oil-pressure bearing apparatus shown in the second arrangement maintains secure and proper functions as a bearing even when the oil-pressure supply system malfunctions.

Those components shown in FIG. 5 designated by reference numerals identical to those of FIG. 1 are substantially identical to those used for the first arrangement. Provision of the ball-and-roller bearing 30 between the stationary disc 11 and the floating discs 12 and 13 for the second arrangement is the main deviation from the structure of the first preferred arrangement. Concretely, circular step members 11A and 11B are provided symmetrically on both sides of the external circumference of the stationary disc 11 in the axial direction. The ball-and-roller bearing 30 is installed between the circular step members 11A and 11B and the floating discs 12 and 13. A plurality of needle rollers 31 that can rotate freely are held by the holders 32. Sheet-like bearing race 33 is installed between these needle rollers 31 and the stationary disc 11, where these needle rollers 31 are directly coupled to the floating discs 12 and 13.

Flush spring 16 is installed between the floating disc 12 and the circular step member 2B which is integrally formed with the rotating shaft 2. The floating disc 12 is pressed against the stationary disc 11 by the force provided by the flush spring 16.

Flush spring 17 is installed between the other floating disc 13 and the circular step member 5A which is integrally formed with the nut 5. The floating disc 13 is pressed against the stationary disc 11 by the force provided by the flush spring 17. The reference numerals 67 and 68 respectively designate a pulley and a belt used for driving an oil pump (not shown).

As described earlier, the oil-pressure bearing apparatus embodied by the invention allows oil to support the floating discs 12 and 13 when a sufficient volume of pressurized oil is available for delivery to the pressurized chambers 18 and 19. Because of this, the system prevents the stationary disc 11 and the floating discs 12 and 13 from having relative rotations with respect to each other due to the presence of the ball-and-roller bearing 30 that has a substantial mechanical resistance.

On the other hand, in the event that oil pressure becomes too low before delivery to the pressurized chambers 18 and 19 as a result of a malfunction of the oil-pressure supply system such as the oil pump for example, the floating discs 12 and 13 respectively function as the race of the ball-and-roller bearing 30 so that the plurality of needle rollers 31 can be rotated. As a result, even when the oil-pressure supply system malfunctions, the stationary disc 11 can be freely rotated and remains supported by the ball-and-roller bearing 30 against the floating discs 12 and 13, thus making it possible for the oil-pressure bearing apparatus to securely maintain a proper function as a bearing.

While the above operation is underway, the floating disc 13 is deformed by the thrust load. However, since the reaction force of the side plate against the thrust load is concentrated at two locations on the internal and external circumferences, the deflection amount of the floating disc 13 is higher than in the case where the floating disc 13 is held by means of oil pressure from the pressurized chamber 19. Because of this deformation, bottom 13A of the floating disc 13 moves in a direction away from the nut 5 and the flush spring 17 as shown in FIG. 6 by means of a phantom line. As a result, the bottom 13A of the floating disc 13 is prevented from generating contact friction and from incurring abrasion.

Figure 7:
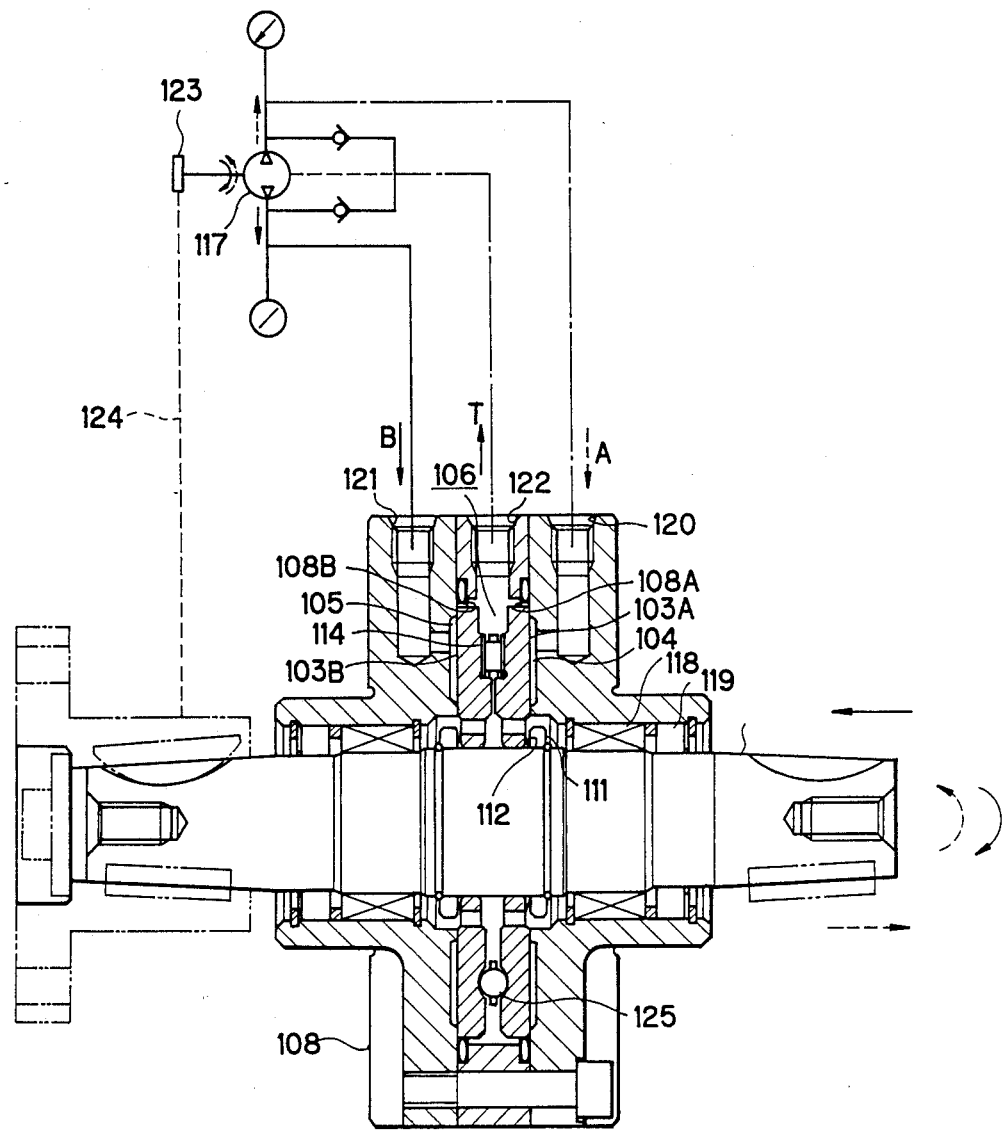
FIG. 7 illustrates a vertical sectional view of the third arrangement of the oil-pressure bearing apparatus related to the invention.

FIG. 7 illustrates the third arrangement of the oil-pressure bearing apparatus related to the invention. The third arrangement is suited for structural simplicity and cost considerations.

In FIG. 7, a pair of freely rotating floating discs 103A and 103B attached to the rotating shaft 10 are stored in the bearing housing 108 which supports the rotating shaft 10 via radial bearing 118 and oil seal member 119. Stopper 111 and snap ring 112 respectively prevent the axial displacement of the floating discs 103A and 103B. A freely rotating roller bearing 114 is installed between these floating discs 103A and 103B.

The pressurized chambers 104 and 105 respectively consisting of circular grooves are provided in the wall surfaces 108A and 108B of the bearing housing 108 which faces the floating discs 103A and 103B. Pressurized oil supply passages 120 and 121 linking the pressurized chambers 104 and 105 to the oil pump 117 are respectively open to the exterior of the bearing housing 108. Oil-discharge passage 122 is provided in the bearing housing 103 to allow the oil pump 117 to suck in oil which flows into the rotating chamber 106 of the bearing housing 108 from the pressurized chambers 104 and 105 through the clearance between the wall surface 108A and the rotating floating discs 103A and 103B.

The oil pump 117 is driven by the rotating shaft 10 via the pulley 123 and the belt 124 coupled to the pulley 123. The oil pump 117 reverses the oil-output direction according to the direction of the rotation of the rotating shaft 101. While the rotating shaft 101 rotates in the normal direction, the thrust load acts on the rotating shaft 101 in the solid arrow direction shown in FIG. 7 for example. On the other hand, oil pressurized by the oil pump 117 is delivered from the oil-supply passage 121 to the pressurized chamber 105. After lubricating the clearance between the floating disc 103B and the wall surface 108B, oil flows into the rotating chamber 106 before eventually being fed back to the suction port of the oil pump 117 via the oil-discharge passage 122. Under the action of the oil-pressure, the floating disc 103B is held in oil away from the wall surface 108B and resists the thrust load. This in turn allows the floating disc 103B to rotate with the rotating shaft 101 and the other floating disc 103A which remain in contact with each other due to a substantial friction force.

When the thrust load increases, the clearance between the floating disc 103B and the wall surface 108B narrows to decrease the volume of oil flowing from the pressurized chamber 105 to the rotating chamber 106. This in turn causes the oil pressure of the pressurized chamber 105 to rise. By causing the oil pressure to rise and fall in the pressurized chamber 105 until the oil pressure balances the varying thrust load, the floating disc 103B remains constantly floating in oil to withstand the thrust load acting on the rotating shaft 101.

On the other hand, when the rotating shaft 101 rotates in the opposite direction, the oil pump 117 also rotates in the opposite direction so that oil can be fed to the rotating chamber 104. After lubricating the clearance between the floating disc 103A and the wall surface 108A, oil flows into the rotating chamber 106 before eventually being fed back to the suction port of the oil pump 117 via the oil-discharge passage 122. Under the action of the oil pressure, the floating disc 103A withstands the thrust load by rotating with the rotating shaft 101 and the floating disc 103B while remaining floating in oil and resisting the thrust load acting in the direction of the arrow shown by a broken line of FIG. 7.

In the event that the oil pump 117 cannot supply oil to the pressurized chambers 104 and 105 due to its own failure while the thrust load is acting in the direction of the solid-arrow since the floating disc 103B sustaining the thrust load directly comes into contact with the wall surface 108B, the rotation of the floating disc 103B is constrained. If this occurs, the other floating disc 103A starts rotating relatively with respect to the rotation-inhibited floating disc 103B by causing the roller bearing 114 to rotate in conjunction with the floating disc 103B, thus making it possible for the system to secure a stable rotation of the rotating shaft 101 and a load-supporting function in the thrust direction. By virtue of the mechanical function mentioned above, even when the oil supply is cut off, the oil-pressure bearing apparatus remains free from incurring severe damage caused by the abrasion of the floating discs 103A, 103B and the rotating shaft 101. The third arrangement allows the use of the ball bearing 125 (shown in the bottom of FIG. 7) in place of the roller bearing 114.

What is claimed is:

1. An oil-pressure bearing apparatus comprising;
a rotating shaft which receives thrust loads
a pair of bearing housings which support said rotating shaft;
a pair of floating discs which are installed on said rotating shaft;
a plurality of rolling components which are installed between said pair of floating discs;
a plurality of pressurized chambers and clearances formed between external surfaces of said pair of floating discs and said pair of bearing housings so that said pressurized chambers and clearances can be positioned in the periphery of said rotating shaft;
an oil-supply passage which links said pressurized chambers to an oil-pressurizing source; and
an oil-feedback passage which links said pressurized clearances to an oil tank.

2. The oil-pressure bearing apparatus as set forth in claim 1, wherein said rolling components are respectively positioned at the middle and in the radial direction of said pressurized chambers so that the thrust load can act on those regions where said thrust load is proportional to the amount of deflection taking place in inner and outer circumferences of said floating discs.

3. The oil-pressure bearing apparatus as set forth in claim 1 or 5, wherein said oil-supply passage is provided with a plurality of orifices which respectively control the volume of oil to be supplied to said pressurized chambers so that said oil-pressure bearing apparatus can constantly support the thrust load based on the difference of oil pressure between both sides of said pressurized chambers.

4. The oil-pressure bearing apparatus as set forth in claim 1 or 5, wherein said oil-pressurizing source is provided by means of a bi-directional output pump connected to said rotating shaft capable of reversing the oil-output direction according to the direction of the rotation of said rotating shaft so that the output oil and the sucked oil can be supplied to said pressurized chambers in both directions.

5. An oil-pressure bearing apparatus comprising;
a rotating shaft which receives thrust loads
a pair of bearing housings which support said rotating shaft;
a stationary disc which is firmly secured to said rotating shaft;
a pair of floating discs which are installed on said rotary shaft so that said floating discs can respectively come into contact with both surfaces of said stationary disc;
a plurality of pressurized chambers and clearances formed between external surfaces of said pair of floating discs and said pair of bearing housings so that said pressurized chambers and clearances can be positioned in the periphery of said rotating shaft;
an oil-supply passage which links said pressurized chambers to an oil-pressurizing source; and
an oil-feedback passage which links said pressurized clearances with an oil tank.

6. The oil-pressure bearing apparatus as set forth in claim 5, wherein said stationary disc is provided with a plurality of axial projections at a position opposite the middle of the radial direction of said pressurized chambers so that said stationary disc can come into contact with said floating discs at the edge surfaces of said projections.

7. The oil pressure bearing apparatus as set forth in claim 5, wherein said stationary disc is provided with a plurality of rolling components in radial formation so that said rolling components can remain in a position opposite the center of the radial direction of said pressurized chambers.

* * * * *